United States Patent [19]
Sakano et al.

[11] Patent Number: 5,513,343
[45] Date of Patent: Apr. 30, 1996

[54] NETWORK MANAGEMENT SYSTEM

[75] Inventors: Hiroshi Sakano; Hiroshi Naruse; Akihiko Masubuchi, all of Tokyo; Ikuko Tachibana, Ehime, all of Japan

[73] Assignee: NEC Corporation, Tokyo, Japan

[21] Appl. No.: 217,703

[22] Filed: Mar. 25, 1994

[30] Foreign Application Priority Data

Mar. 25, 1993 [JP] Japan ................................ 5-090767

[51] Int. Cl.⁶ .................................................. G06F 11/00
[52] U.S. Cl. ........................................ 395/183.02; 395/54
[58] Field of Search ............................. 371/15.1; 395/50, 395/54, 56, 183.01, 183.02; 364/267

[56]           References Cited
        U.S. PATENT DOCUMENTS

| | | | |
|---|---|---|---|
| 4,812,819 | 3/1989 | Corsberg | 340/517 |
| 5,159,685 | 10/1992 | Kung | 395/575 |
| 5,295,230 | 3/1994 | Kung | 395/75 |
| 5,337,320 | 8/1994 | Kung | 371/15.1 |

FOREIGN PATENT DOCUMENTS 2-50540  2/1990  Japan.
2-283137 11/1990 Japan.

Primary Examiner—Robert W. Beausoliel, Jr.
Assistant Examiner—Norman M. Wright
Attorney, Agent, or Firm—Foley & Lardner

[57]           ABSTRACT

The present invention relates to a network management system, and more particularly to a network management system for managing the states of plural alarm information generating from each one of the objects, which are to be managed, and stored in a state management area.

Detailed information storage program of agents stores into detailed information files detailed information contained in alarm information transmitted from objects; alarm information coding program of a manager converts alarm information into alarm codes; and state management program stores the alarm codes into a state management area. A knowledge base enters combinations of alarm codes and effects of alarm information as decision patterns, and failure decision program decides upon failures by matching, at the time of receiving alarm information, the knowledge base and the state management area with each other.

8 Claims, 21 Drawing Sheets

FIG. 4

| ALARM CODE | MAIN CAUSE / EFFECT | DECISION PATTERN |
|---|---|---|
| 0025 | MAIN CAUSE | C1 |
| 0013 | MAIN CAUSE | A1 |
| 0013 | EFFECT | — |
| 0033 | EFFECT | A1 |
| 0034 | EFFECT | A1 |
| 0026 | MAIN CAUSE | B1 |

| DECISION PATTERN | MAIN CAUSE ALARM CODE | EFFECT ALARM CODE | RELEVANT OBJECT |
|---|---|---|---|
| A1 | 0013 | 0033<br>0034 | NEXT OBJECT |
| B1 | 0026 | — | — |
| C1 | 0025 | — | — |

| ALARM CODE | PERCEIVED SEVERITY | FAILURE TYPE |
|---|---|---|
| 0025 | MN | MAIN UNIT |
| 0013 | MJ | MAIN UNIT |
| 0033 | MN | SUBORDINATE UNIT |
| 0034 | MN | SUBORDINATE UNIT |
| 0026 | MN | MAIN UNIT |

| OBJECT ID | COMMON PART | INTENSIVE FLAG OF PERCEIVED SEVERITY (AGGREGATE VALUE) | DETAILED INTENSIVE FLAG OF PERCEIVED SEVERITY | | | PECULIAR PART | | |
|---|---|---|---|---|---|---|---|---|
| OBJECT 2A | CR ALARM | MAIN UNIT FAILURE | | | | | | |
| | | PERIPHERAL UNIT FAILURE | | | | | | |
| | | SUBORDINATE UNIT FAILURE | | | | | | |
| | MJ ALARM | MAIN UNIT FAILURE | 1 | | 00251 | | | |
| | | PERIPHERAL UNIT FAILURE | | | | | | |
| | | SUBORDINATE UNIT FAILURE | | | | | | |
| | MN ALARM | MAIN UNIT FAILURE | | | | | | |
| | | PERIPHERAL UNIT FAILURE | | | | | | |
| | | SUBORDINATE UNIT FAILURE | | | | | | |
| | CA ALARM | MAIN UNIT FAILURE | | | | | | |
| | | PERIPHERAL UNIT FAILURE | | | | | | |
| | | SUBORDINATE UNIT FAILURE | | | | | | |

RECOVERY FLAG — COMPLETION FLAG

FIG. 10B

| OBJECT ID | COMMON PART | (AGGREGATE VALUE) | PECULIAR PART | | | | | | | | | | | |
|---|---|---|---|---|---|---|---|---|---|---|---|---|---|---|
| OBJECT 2A | CR ALARM | MAIN UNIT FAILURE | | | | | | | | | | | | |
| | | PERIPHERAL UNIT FAILURE | | | | | | | | | | | | |
| | | SUBORDINATE UNIT FAILURE | | | | | | | | | | | | |
| | MJ ALARM | MAIN UNIT FAILURE | | | | | | | | | | | | |
| | | PERIPHERAL UNIT FAILURE | | | | | | | | | | | | |
| | | SUBORDINATE UNIT FAILURE | | | | | | | | | | | | |
| | MN ALARM 1 | MAIN UNIT FAILURE 1 | | | | | 00251 | | | 00261 | | | | |
| | | PERIPHERAL UNIT FAILURE | | | | | | | | | | | | |
| | | SUBORDINATE UNIT FAILURE | | | | | | | | | | | | |
| | CA ALARM | MAIN UNIT FAILURE | | | | | | | | | | | | |
| | | PERIPHERAL UNIT FAILURE | | | | | | | | | | | | |
| | | SUBORDINATE UNIT FAILURE | | | | | | | | | | | | |

FIG. 10C

| OBJECT ID | COMMON PART | | (AGGREGATE VALUE) | PECULIAR PART | | | | | | | | | | |
|---|---|---|---|---|---|---|---|---|---|---|---|---|---|---|
| OBJECT 2A | CR ALARM | | MAIN UNIT FAILURE | | | | | | | | | | | |
| | | | PERIPHERAL UNIT FAILURE | | | | | | | | | | | |
| | | | SUBORDINATE UNIT FAILURE | | | | | | | | | | | |
| | MJ ALARM | 1 | MAIN UNIT FAILURE | 1 | | | | 00131 | | | | | | |
| | | | PERIPHERAL UNIT FAILURE | | | | | | | | | | | |
| | | | SUBORDINATE UNIT FAILURE | | | | | | | | | | | |
| | MN ALARM | 1 | MAIN UNIT FAILURE | 1 | | | | 00251 | | | 00261 | | | |
| | | | PERIPHERAL UNIT FAILURE | | | | | | | | | | | |
| | | | SUBORDINATE UNIT FAILURE | | | | | | | | | | | |
| | CA ALARM | | MAIN UNIT FAILURE | | | | | | | | | | | |
| | | | PERIPHERAL UNIT FAILURE | | | | | | | | | | | |
| | | | SUBORDINATE UNIT FAILURE | | | | | | | | | | | |

FIG. 10D

| OBJECT ID | COMMON PART | (AGGREGATE VALUE) | PECULIAR PART | | | | | | | | | | | |
|---|---|---|---|---|---|---|---|---|---|---|---|---|---|---|
| OBJECT 2B | CR ALARM | MAIN UNIT FAILURE | | | | | | | | | | | | |
| | | PERIPHERAL UNIT FAILURE | | | | | | | | | | | | |
| | | SUBORDINATE UNIT FAILURE | | | | | | | | | | | | |
| | MJ ALARM | MAIN UNIT FAILURE | | | | | | | | | | | | |
| | | PERIPHERAL UNIT FAILURE | | | | | | | | | | | | |
| | | SUBORDINATE UNIT FAILURE | | | | | | | | | | | | |
| | MN ALARM | MAIN UNIT FAILURE | | | | | | | | | | | | |
| | | PERIPHERAL UNIT FAILURE | | | | | | | | | | | | |
| | | SUBORDINATE UNIT FAILURE | 1 | 00330 | | | | | 00340 | | | | | |
| | CA ALARM | MAIN UNIT FAILURE | | | | | | | | | | | | |
| | | PERIPHERAL UNIT FAILURE | | | | | | | | | | | | |
| | | SUBORDINATE UNIT FAILURE | | | | | | | | | | | | |

FIG. 10E

| OBJECT ID | COMMON PART | | (AGGREGATE VALUE) | PECULIAR PART | | | | | | | | | | | |
|---|---|---|---|---|---|---|---|---|---|---|---|---|---|---|---|
| OBJECT 2A | CR ALARM | MAIN UNIT FAILURE | | | | | | | | | | | | | |
| | | PERIPHERAL UNIT FAILURE | | | | | | | | | | | | | |
| | | SUBORDINATE UNIT FAILURE | | | | | | | | | | | | | |
| | MJ ALARM 1 | MAIN UNIT FAILURE | 1 | | | | | 00131 | | | | | | | |
| | | PERIPHERAL UNIT FAILURE | | | | | | | | | | | | | |
| | | SUBORDINATE UNIT FAILURE | | | | | | | | | | | | | |
| | MN ALARM 0 | MAIN UNIT FAILURE | 0 | | | | | 10251 | | | 10261 | | | | |
| | | PERIPHERAL UNIT FAILURE | 1 | | | | | | | | | | | | |
| | | SUBORDINATE UNIT FAILURE | | | | | | | | | | | | | |
| | CA ALARM | MAIN UNIT FAILURE | | | | | | | | | | | | | |
| | | PERIPHERAL UNIT FAILURE | | | | | | | | | | | | | |
| | | SUBORDINATE UNIT FAILURE | | | | | | | | | | | | | |

FIG. 10F

| OBJECT ID | COMMON PART | (AGGREGATE VALUE) | | PECULIAR PART | | | | | | | | | | |
|---|---|---|---|---|---|---|---|---|---|---|---|---|---|---|
| OBJECT 2A | CR ALARM | MAIN UNIT FAILURE | | | | | | | | | | | | |
| | | PERIPHERAL UNIT FAILURE | | | | | | | | | | | | |
| | | SUBORDINATE UNIT FAILURE | | | | | | | | | | | | |
| | MJ ALARM 0 | MAIN UNIT FAILURE | 0 | | | | | | | | | | | |
| | | PERIPHERAL UNIT FAILURE | 1 | 10131 | | | | | | | | | | |
| | | SUBORDINATE UNIT FAILURE | | | | | | | | | | | | |
| | MN ALARM 0 | MAIN UNIT FAILURE | 0 | | | | | | | | | | | |
| | | PERIPHERAL UNIT FAILURE | 1 | 10251 | | | 10261 | | | | | | | |
| | | SUBORDINATE UNIT FAILURE | | | | | | | | | | | | |
| | CA ALARM | MAIN UNIT FAILURE | | | | | | | | | | | | |
| | | PERIPHERAL UNIT FAILURE | | | | | | | | | | | | |
| | | SUBORDINATE UNIT FAILURE | | | | | | | | | | | | |

FIG. 10G

| OBJECT ID | COMMON PART | (AGGREGATE VALUE) | PECULIAR PART | | | | | | | | | | | | |
|---|---|---|---|---|---|---|---|---|---|---|---|---|---|---|---|
| OBJECT 2B | CR ALARM | MAIN UNIT FAILURE | | | | | | | | | | | | | |
| | | PERIPHERAL UNIT FAILURE | | | | | | | | | | | | | |
| | | SUBORDINATE UNIT FAILURE | | | | | | | | | | | | | |
| | MJ ALARM | MAIN UNIT FAILURE | | | | | | | | | | | | | |
| | | PERIPHERAL UNIT FAILURE | | | | | | | | | | | | | |
| | | SUBORDINATE UNIT FAILURE | | | | | | | | | | | | | |
| | MN ALARM 0 | MAIN UNIT FAILURE | | | | | | | | | | | | | |
| | | PERIPHERAL UNIT FAILURE | | | | | | | | | | | | | |
| | | SUBORDINATE UNIT FAILURE 0 | | | | | | | | | | | | | |
| | CA ALARM | MAIN UNIT FAILURE | | | | | | | | | | | | | |
| | | PERIPHERAL UNIT FAILURE | | | | | | | | | | | | | |
| | | SUBORDINATE UNIT FAILURE | | | | | | | | | | | | | |

| | OBJECT A | OBJECT B | OBJECT C | OBJECT D |
|---|---|---|---|---|
| ① | 100000 | 010000 | 010000 | 000000 |
| ② | 010000 | 100000 | 000000 | 010000 |
| ③ | 010000 | 000000 | 100000 | 100000 |
| ④ | 000000 | 010000 | 010000 | 100000 |
| ⑤ | 110000 | 010000 | 000000 | 100000 |
| ⑥ | 110000 | 000000 | 010000 | 010000 |
| ⑦ | 110000 | 010000 | 010000 | 110000 |

| MAIN CAUSE | EFFECT | SCOPE OF EFFECT |
|---|---|---|
| a1 | b | ADJOINING OBJECT |
| a2 | — | — |

NETWORK MANAGEMENT SYSTEM

BACKGROUND OF THE INVENTION

The present invention relates to a network management system, and more particularly to a network management system for storing a plurality of alarm information in an alarm code form and managing them. The alarm information is generated from each one of the objects, which are to be managed.

Each object may be in various states. For instance, object A may be in a state in which alarm a1 has arisen and in another state in which alarm a2 has arisen.

Conventional state management systems for managing the states of objects for each, of which a plurality of alarms may have arisen simultaneously can be broadly classified into two types: one method using bit patterns (see the JP-A-283137 (1990)) and the other method using the storage of alarm information (see JP-A-50540 (1990)).

By the method using bit patterns, a network management system manages a plurality of alarms, arising for each object, in a bit pattern form. Thus, in identifying the main cause alarm which gives rise to the true alarm among the plurality of alarms, a state management area, from a few bytes to a few dozens of bytes, for arising alarms is secured in a memory for each object, and a specific alarm is assigned for each bit in the state management area. The bit is ON when an alarm has arisen, and OFF when in a recovered (normal) state. For instance in a network consisting of objects A, B, C and D as illustrated in FIG. 2, if alarms a1 and a2 arise in object A and alarm b occurs in objects B and C, the state management area is updated as shown in FIG. 11A.

Further, every combination of alarm codes, coded expressions of alarm information indicated as messages or bit patterns, that may arise is entered in a fixed form as a bit pattern for comparison with the state management area. The entry of bit patterns should take account of the network configuration of the objects which are to be managed. Each bit pattern represents the result of identification of one main cause alarm as distinguished from effect alarms, alarms arising secondarily as consequences of the true cause of failure which is the main cause. If, upon occurrence of alarm a1, effect alarm b arises in the adjoining object but alarm a2 does not affect the adjoining object, bit patterns shown in FIG. 11B should be entered. For instance, FIG. 11B ① indicates that "alarm a1 arising in object A affected objects B and C." Therefore, this method using bit patterns requires the addition of a new, or the modification of the existing, decision bit pattern for identifying the one main cause alarm out of a plurality of alarms every time any alarm code is added or the system structure information is updated. Furthermore, as the number of bit patterns increases acceleratedly with an increase in the variety of alarms, their maintenance takes a very long time. By the bit pattern method, the states of objects are derived by matching in a fixed period the currently existing bit patterns in the state management area with the entered bit patterns.

On the other hand, by the method using the storage of alarm information, alarm information is saved and stored in a file either as it is or in a coded form. This method has a decision logic by which, for instance if alarms a1 and a2 arise in object A and alarm b occurs in objects B and C as shown in FIG. 2, a file shown in FIG. 11C is searched with alarm a1 as key to find its combination with alarm b, and a final decision is made according to correspondence with system structure information. Even if alarm information cannot be collected from object A for some reason, if the occurrence of alarm b in objects B and C is known, the occurrence of alarm a1 in object A can be presumed. In this manner, by the method using the storage of alarm information, the state for which either alarm a1 or a2 is the main cause alarm is derived by searching the storage files.

According to the conventional state management system by the method using bit patterns, every alarm is assigned to a bit on an object-by-object basis. Therefore, in order to manage a plurality of alarms arising in the same object, all the combinations of bit patterns of both the applicable object and the affected objects should be entered, with the system structure also taken into consideration. As a consequence, there is the problem that bit patterns should be entered or altered every time the object structure is changed by the additional installation or removal of any object. There is another problem that increases in the number of objects and in the variety of alarms would invite an accelerated enlargement of the capacity of the state management area. Furthermore, there is still another problem that, when detailed information on the failure is added by a message, since the quantity of information that can be held in a bit pattern form is limited, the added detailed information is discarded and invalidated when it is to be converted into a bit pattern.

On the other hand, according to the conventional system by the method using the storage of alarm information, an increase in alarm information would entail not only a change in decision logic but also an elongation of the searching time needed for decision. If, conversely, an attempt is made to shorten the time required for decision, the logic will become complex, resulting in a longer maintenance time. If the object structure is frequently altered, many manhours will also have to be spent on maintenance. Thus, the system by the method using the storage of alarm information also involves the problem of vulnerability to changes in logic or object structure accompanying an increase in alarm information.

The object of the present invention is to provide a network management system capable of flexibly coping with changes in alarm information or object structure by using alarm codes stored in a state management area for the state management of plural alarm information generated from one object.

SUMMARY OF THE INVENTION

According to the invention, there is provided a network management system for managing a plurality of objects connected to a network, comprising: detailed information storage means for storing into detailed information files detailed information contained in alarm information transmitted from the objects; alarm information code means for converting the alarm information into alarm codes; state management means for storing into a state management area alarm codes into which alarm information has been converted by the alarm information code means; a knowledge base for entering combinations of alarm codes and effects of alarm information as decision patterns; and failure decision means for deriving a decision result by matching, at the time of receiving alarm information, said knowledge base and said state management area with each other.

The state management area in the network management system according to the invention consists of a common part further comprising an object identifier (ID) and aggregate values of conditions; a peculiar part further comprising a plurality of sets of alarm codes, types of detailed information files, and hash keys; and an overflow pointer.

The knowledge base comprises a failure pattern decision table for saving alarm codes, main causes/effects, and decision patterns; a cause decision table for saving decision patterns, main cause alarm codes, effect alarm codes, and relevant objects; and an alarm code-perceived severity table for saving alarm codes, perceived severity, and failure types.

Further in the network management system according to the invention, when said state management area can save no more alarm code, the additional alarm codes are saved into another file by said overflow pointer.

The detailed information storage means are included among agents, while said alarm information code means, said state management means, and said failure decision means are included in a manager.

BRIEF DESCRIPTION OF THE DRAWINGS

FIG. 4 is a diagram illustrating a specific configuration of the failure pattern decision table saved in the knowledge base of FIG. 1.

FIG. 5 is a diagram illustrating a specific configuration of the cause decision table saved in the knowledge base of FIG. 1.

FIG. 6 is a diagram illustrating a specific configuration of the alarm code-perceived severity table saved in the knowledge base of FIG. 1.

FIGS. 10A–10G show specific examples of the contents of the state management area in the network management system according to the invention.

FIGS. 11A–11C show specific examples of the prior art wherein: FIG. 11A is a diagram illustrating the principle of a conventional state management system using bit patterns; FIG. 11B is a schematic diagram of a specific example of an another conventional state management system using bit patterns; and FIG. 11C is a diagram illustrating the principle of a still another conventional state management system using the storage of alarm information.

DESCRIPTION OF THE PREFERRED EMBODIMENTS

The present invention will be described in detail below with reference to the accompanying drawings.

Figure 1:
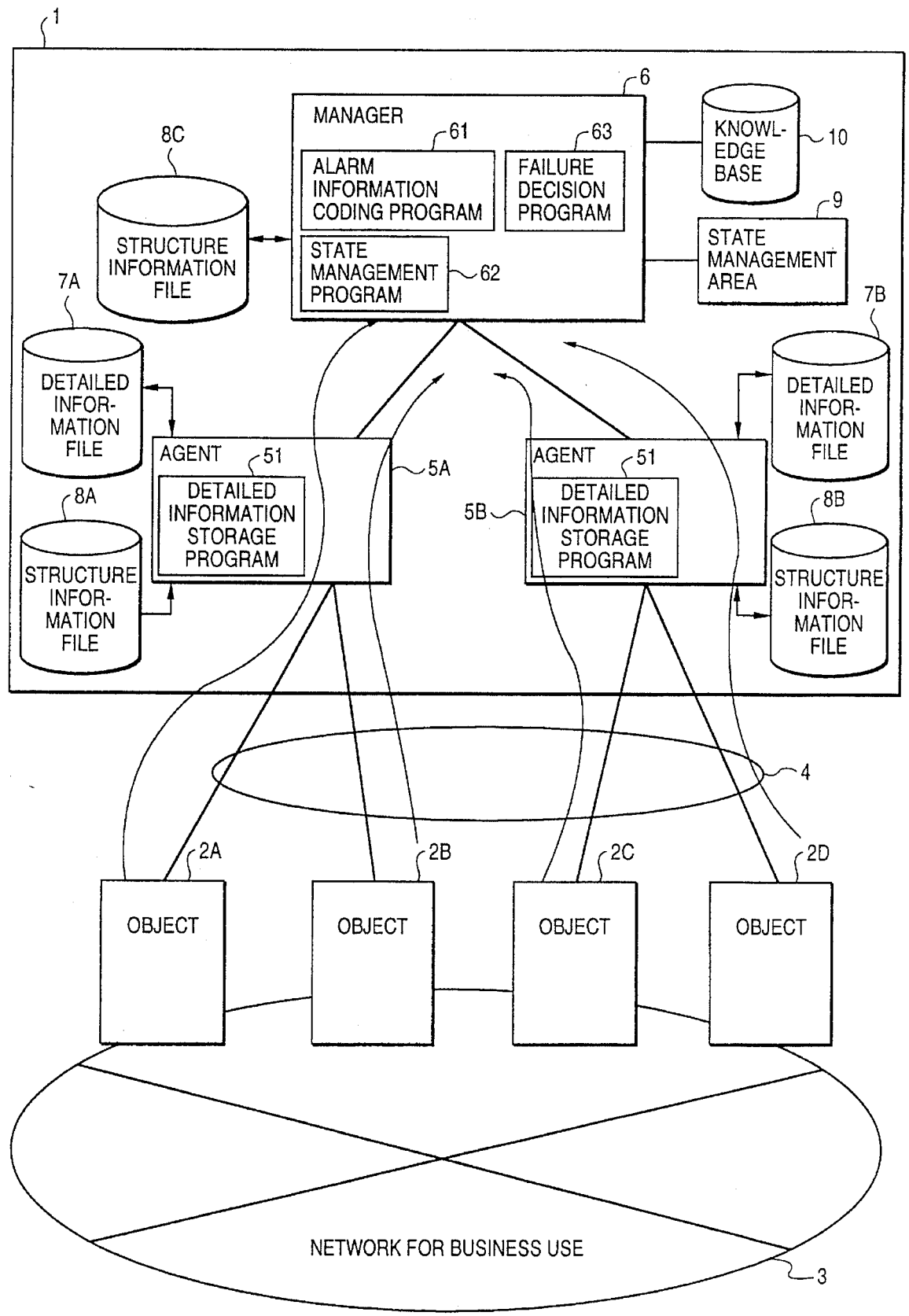
FIG. 1 is a block configuration diagram of a network management system according to the invention.
Figure 2:
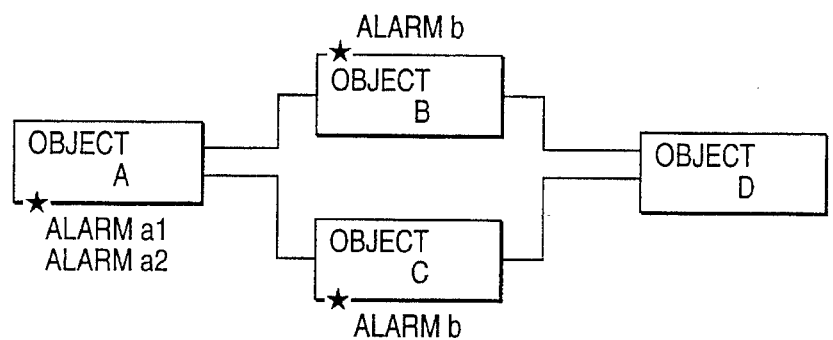
FIG. 2 shows an example of alarm for each object, detacted by a network management system having four objects (A, B, C and D).

FIG. 1 is a block configuration diagram of a network management system, which is a preferred embodiment of the invention. A network management system 1 is connected via a network 4 for management to plural objects 2A through 2D (the network management system 1 has four objects to manage in FIG. 1; hereinafter collectively identified by sign 2), connected to one another via a network 3 for business use.

The network management system 1 has plural agents 5A through 5B (the network management system 1 has two agents in FIG. 1; hereinafter collectively identified by sign 5) which receive alarm information transmitted from the objects 2 and perform management operations directly on the objects 2; a manager 6 for collecting the alarm information received by the agents 5 and giving instructions on management operations for the objects 2; detailed information files 7A through 7B (it has two detailed information files in FIG. 1; hereinafter collectively identified by sign 7) for saving details of the alarm information; structure information files 8A through 8C (it has three structure information files in FIG. 1; hereinafter collectively identified by sign 8) for saving structure information of a system; a state management area 9 for storing alarm codes; and a knowledge base 10 for entering as decision patterns the combinations of alarm codes and the effects of alarm information.

Incidentally, the agents 5 and the manager 6 may be structured either on the same computer or different computers.

Each of the agents 5 includes detailed information storage program 51.

The manager 6 includes alarm information coding program 61, state management program 62, and failure decision program 63.

Figure 3:
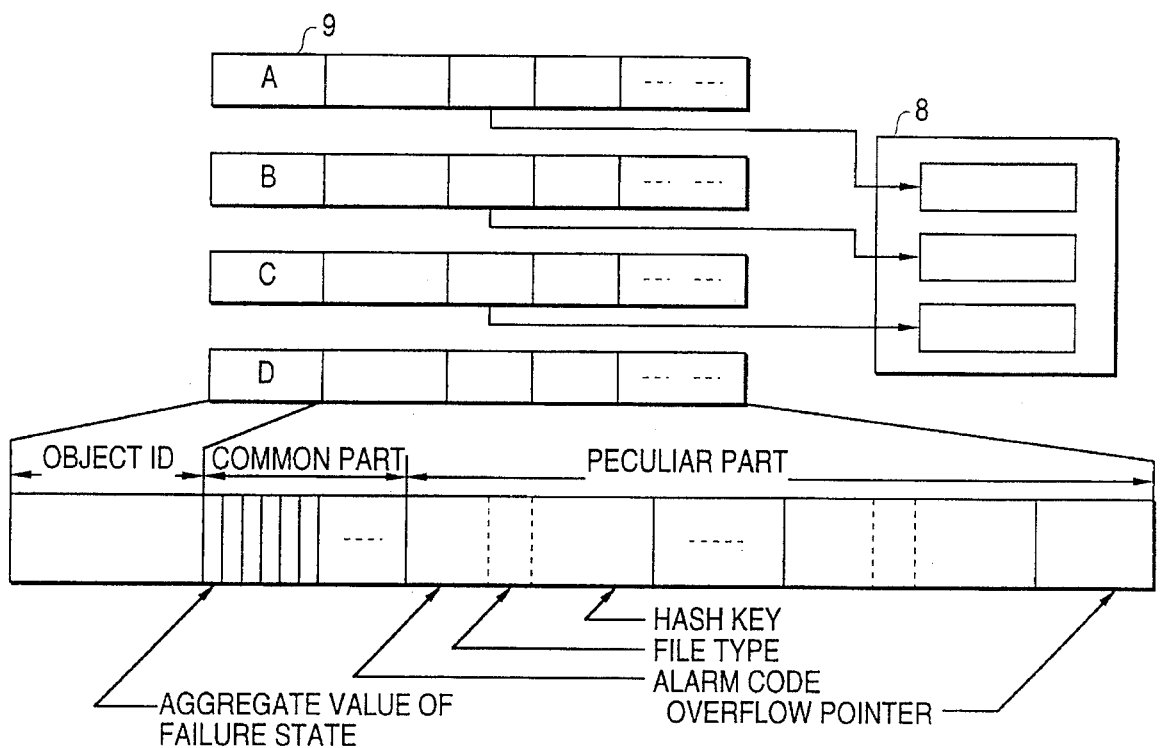
FIG. 3 is a diagram illustrating a specific configuration of the state management area of FIG. 1.
Figure 7A:
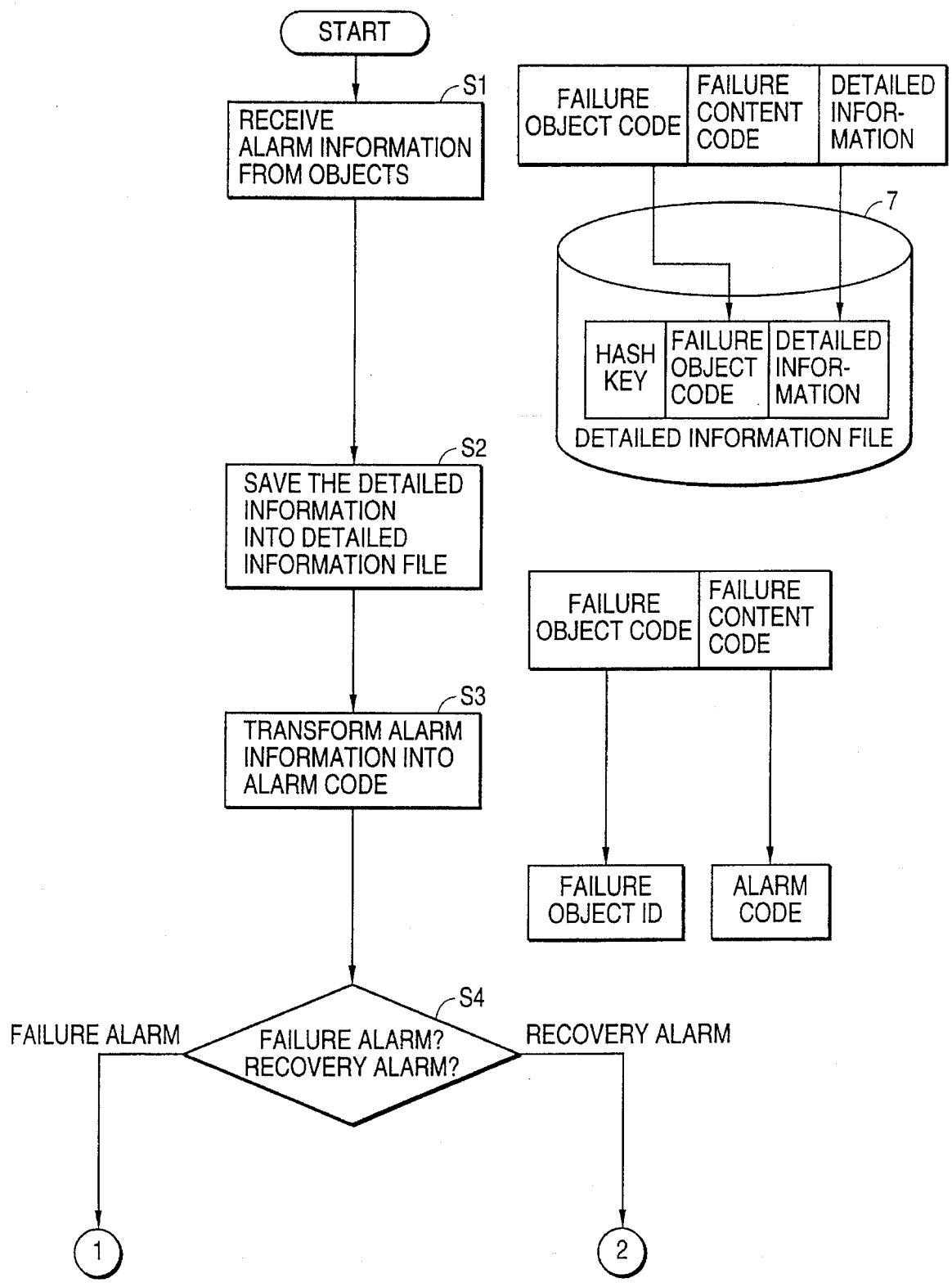
FIGS. 7A–7G are flow charts showing the processing to enter or delete alarm information in the network management system according to the invention.
Figure 7B:
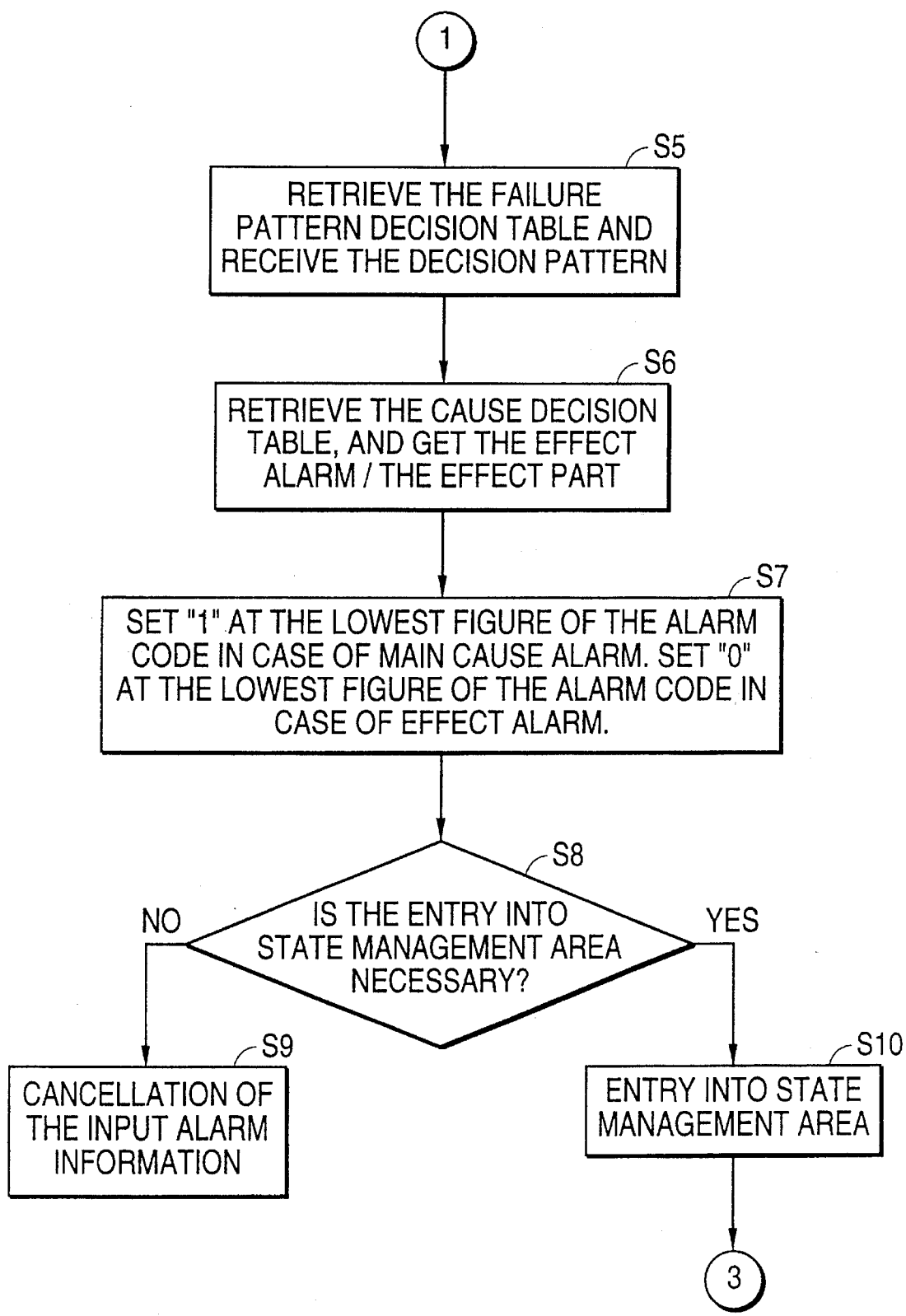
Figure 7C:
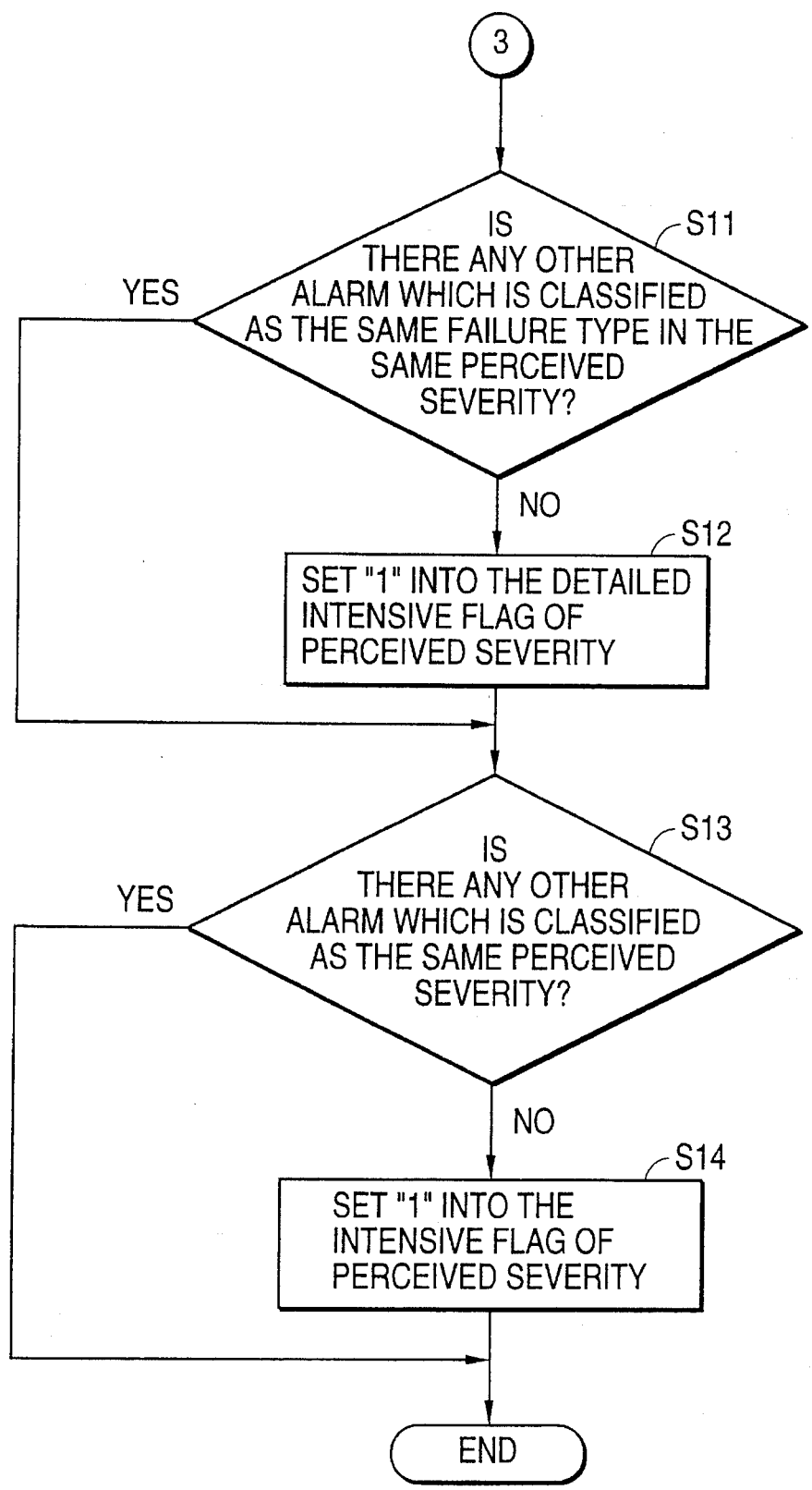
Figure 7D:
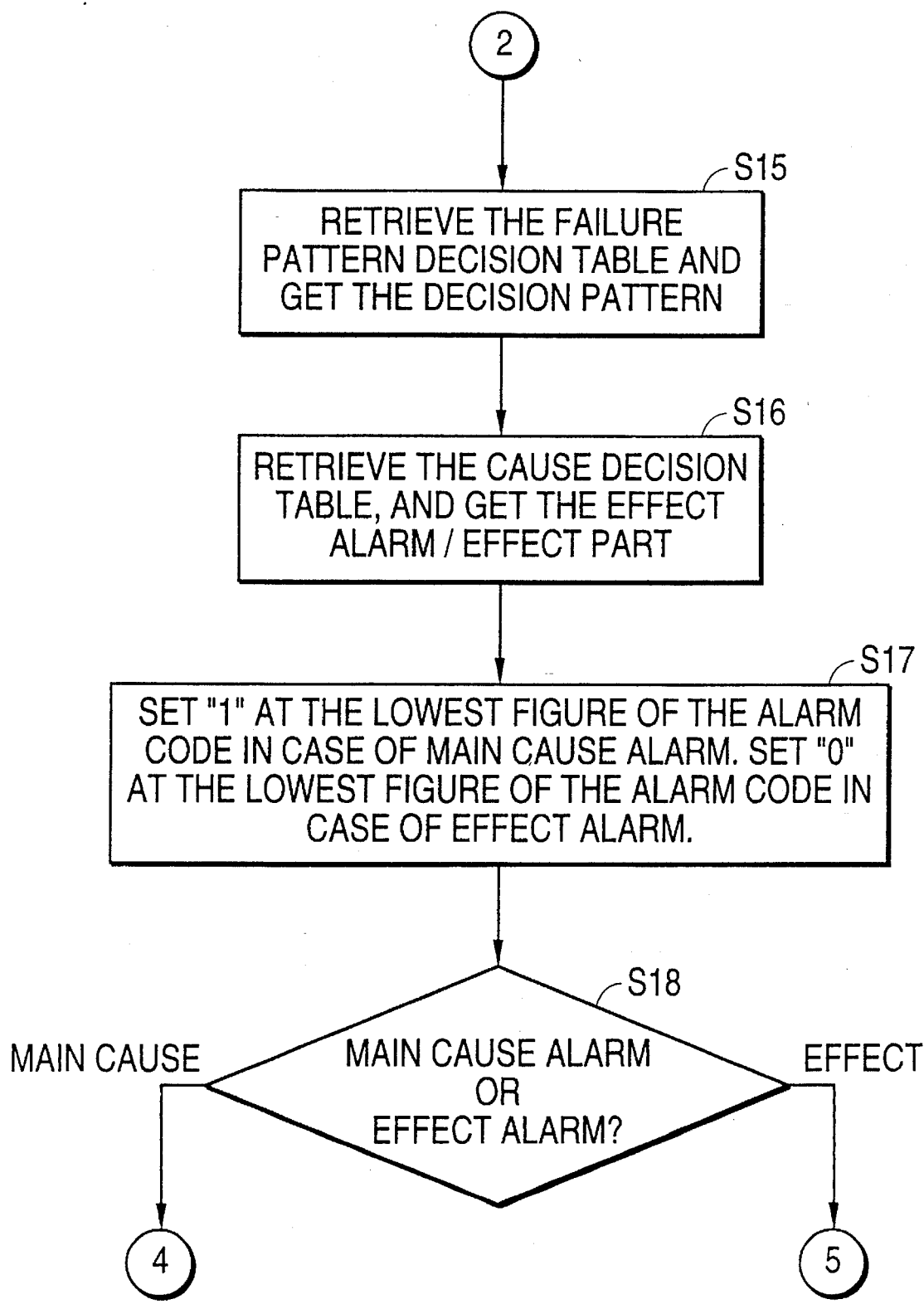
Figure 7E:
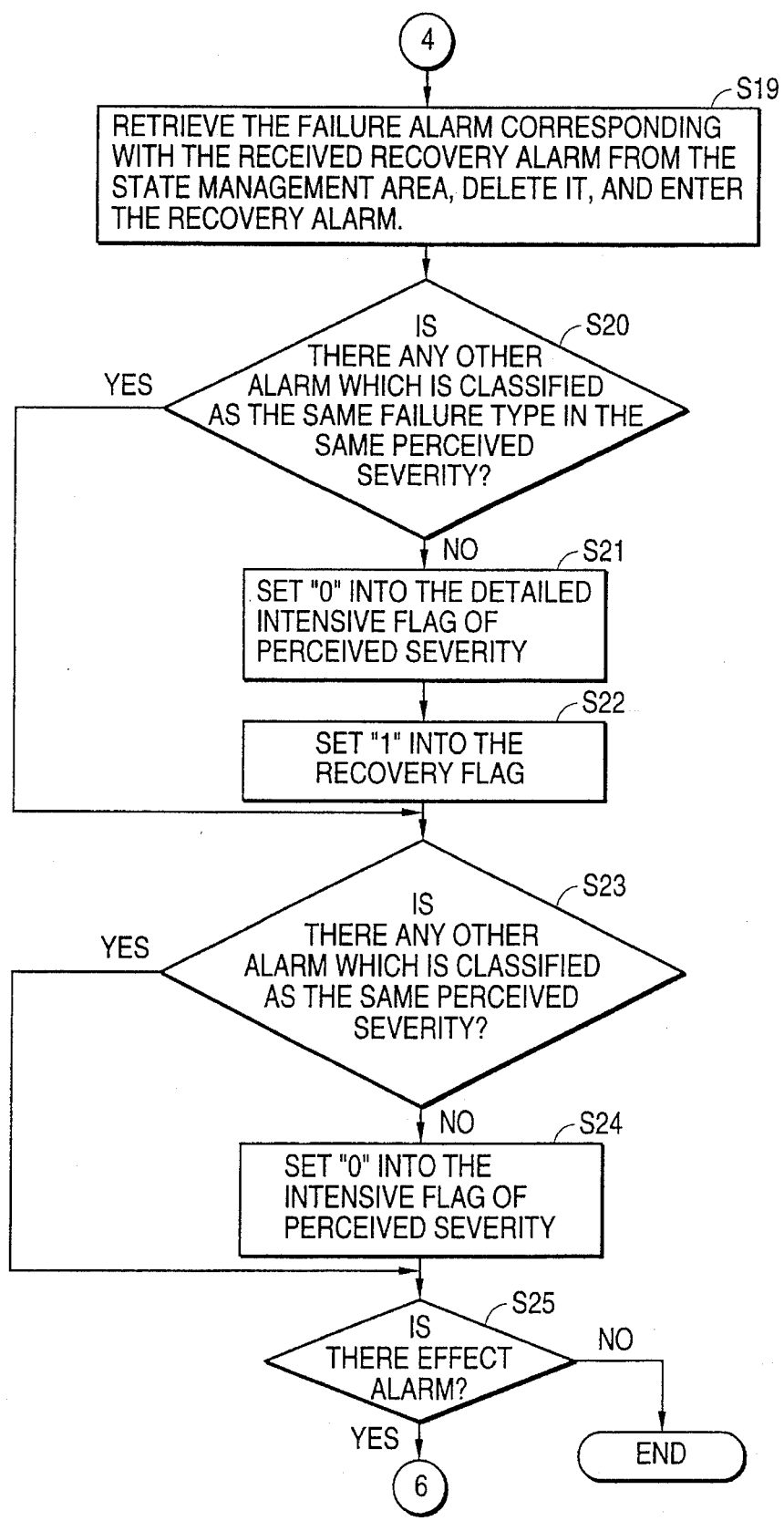
Figure 7F:
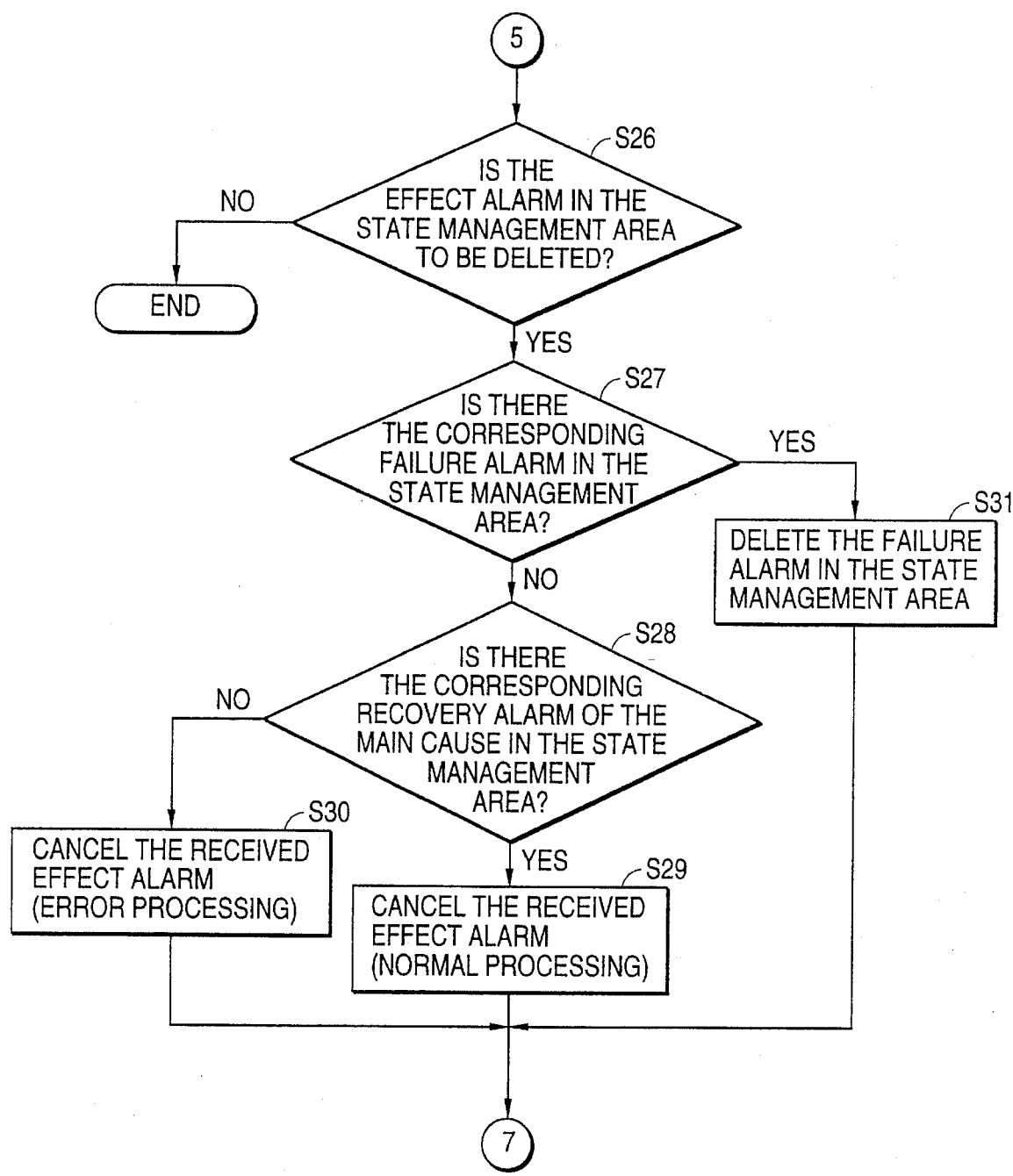
Figure 7G:
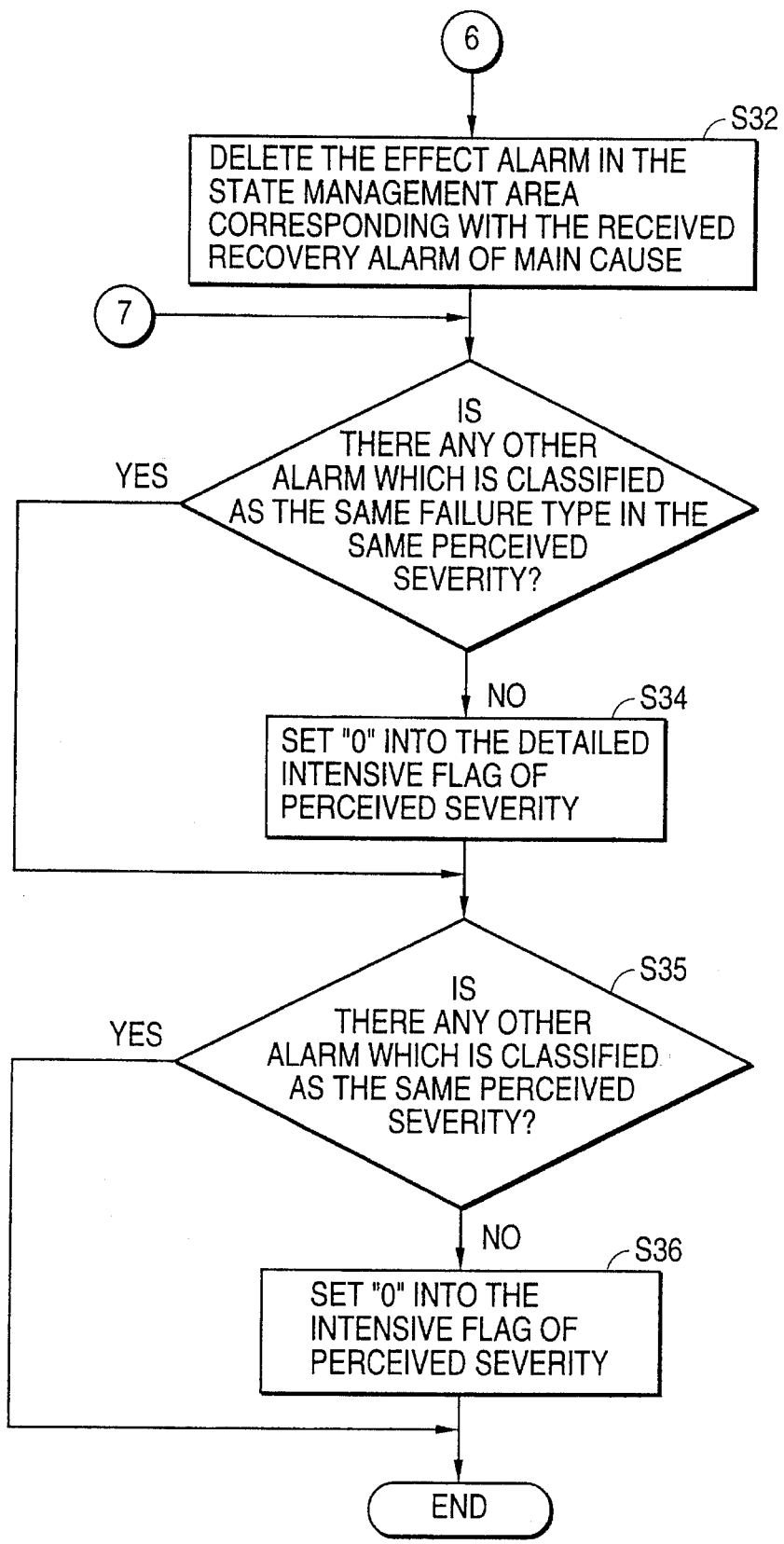

Referring to FIG. 3, the state management area 9 consists of an object identifier (ID), a common part including and aggregate values of failure conditions, and a peculiar part into which a plurality of sets of alarm codes, types of the detailed information files 8, and hash keys are saved. Furthermore, an overflow pointer can be saved at the end of the peculiar part.

As shown in FIGS. 10A–10G, in the common part are provided areas for critical (CR) alarms, major (MJ) alarms, minor (MN) alarms, and caution (CA) alarms, and in each of these areas are saved an intensive flag of perceived severity and detailed intensive flags of perceived severity, recovery flags and completion flags, one of which is assigned to a main unit failure, peripheral unit failure and subordinate unit failure.

In the peculiar part are secured plural areas of each alarm for saving alarm codes, types of files, and hash keys corresponding to the main unit failure, peripheral unit failure and subordinate unit failure.

Hereinafter, the group of areas corresponding to each type of failure will be called a record.

FIG. 4 shows that a failure pattern decision table 101 saved in the knowledge base 10 consists of a plurality of records comprising alarm codes, main causes/effects, and decision patterns.

FIG. 5 shows that a cause decision table 102 saved in the knowledge base 10 consists of a plurality of records comprising decision patterns, main cause alarm codes, effect alarm codes, and relevant objects.

FIG. 6 shows that an alarm code-perceived severity table 103 saved in the knowledge base 10 consists of a plurality of records comprising alarm codes, perceived severity and failure types.

FIGS. 7A–7G show that the processing to enter or delete alarm information in the network management system 1 according to the invention comprises the following steps.

Alarm information reception step S1, detailed information saving step S2, alarm code transformation step S3, failure/recovery alarm decision step S4, decision pattern acquisition step S5, effect alarm/affected part acquisition step S6, alarm code at the lowest figure setting step S7, entry into state management area decision step S8, input alarm information cancellation step S9, state management area entry step S10, another alarm in the same category entry decision step S11, the detailed intensive flag of perceived severity "1" setting step S12, another alarm in the same category entry decision step S13, perceived severity detailed intensive flag setting step S14, decision pattern acquisition Step S15, effect alarm/affected part acquisition step S16, alarm code at the lowest figure setting step S17, main cause alarm/effect alarm decision step S18, failure alarm delete on/recovery alarm entry step S19, another alarm in the same category entry decision step S20, the detailed intensive flag of perceived severity "0" setting step S21, a recovery flag "1" setting step S22, another alarm in the same category entry decision step S23, the detailed intensive flag of perceived severity "0" setting step S24, effect alarm occurrence decision step S25, effect alarm deletion decision step S26, failure alarm entry decision step S27, main cause recovery alarm entry decision step S28, effect alarm cancellation (normal processing) step S29, effect alarm cancellation (error processing) step S30, failure alarm deletion step S31, effect alarm deletion step S32, another alarm in the same category entry decision step S33, the detailed intensive flag of perceived severity "0" setting step S34, another alarm in the same category entry decision step S35, and the detailed intensive flag of perceived severity "0" setting step S36.

Figure 8:
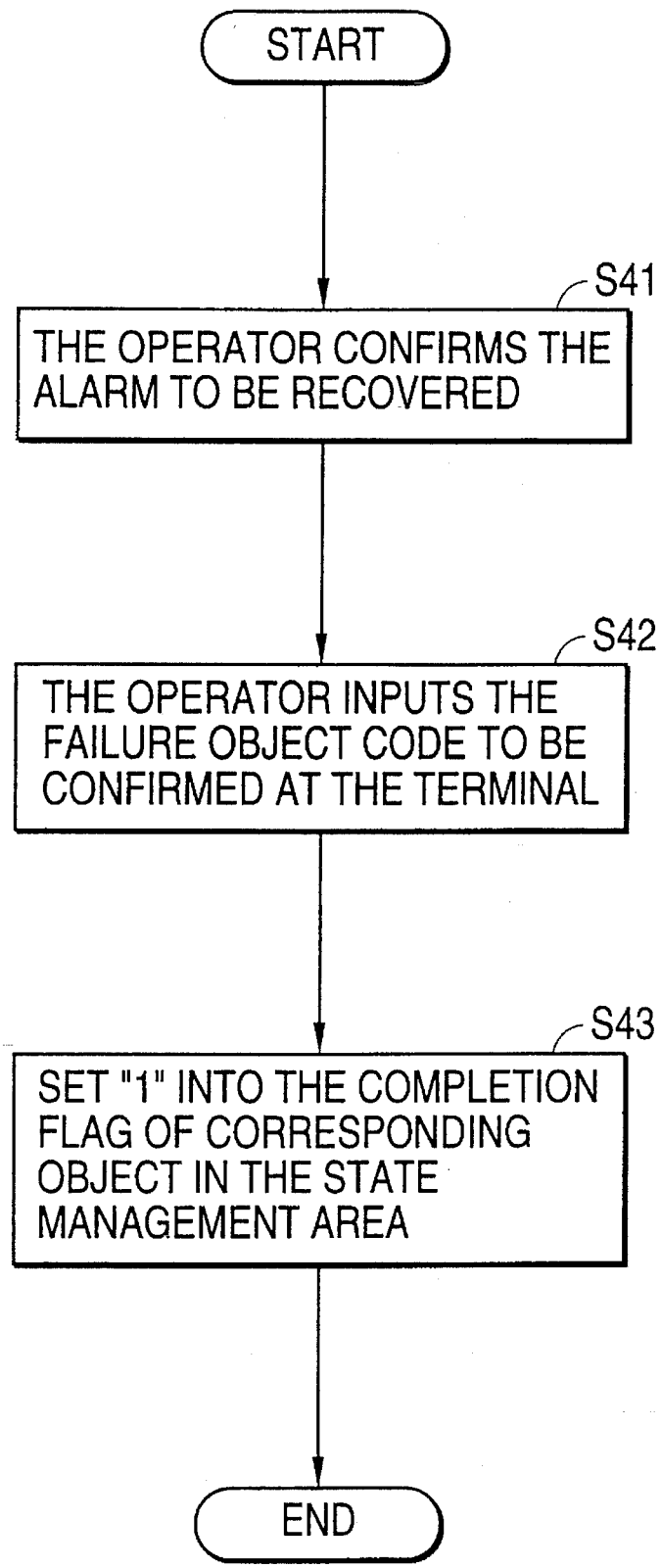
FIG. 8 is a flow chart showing the processing to set a completed flag in the network management system according to the invention.

FIG. 8 shows that the processing to set a completion flag in the network management system 1 according to the invention comprises alarm recovery confirmation step S41, failed object code input step S42, and a completion flag "1" setting step S43.

Figure 9:
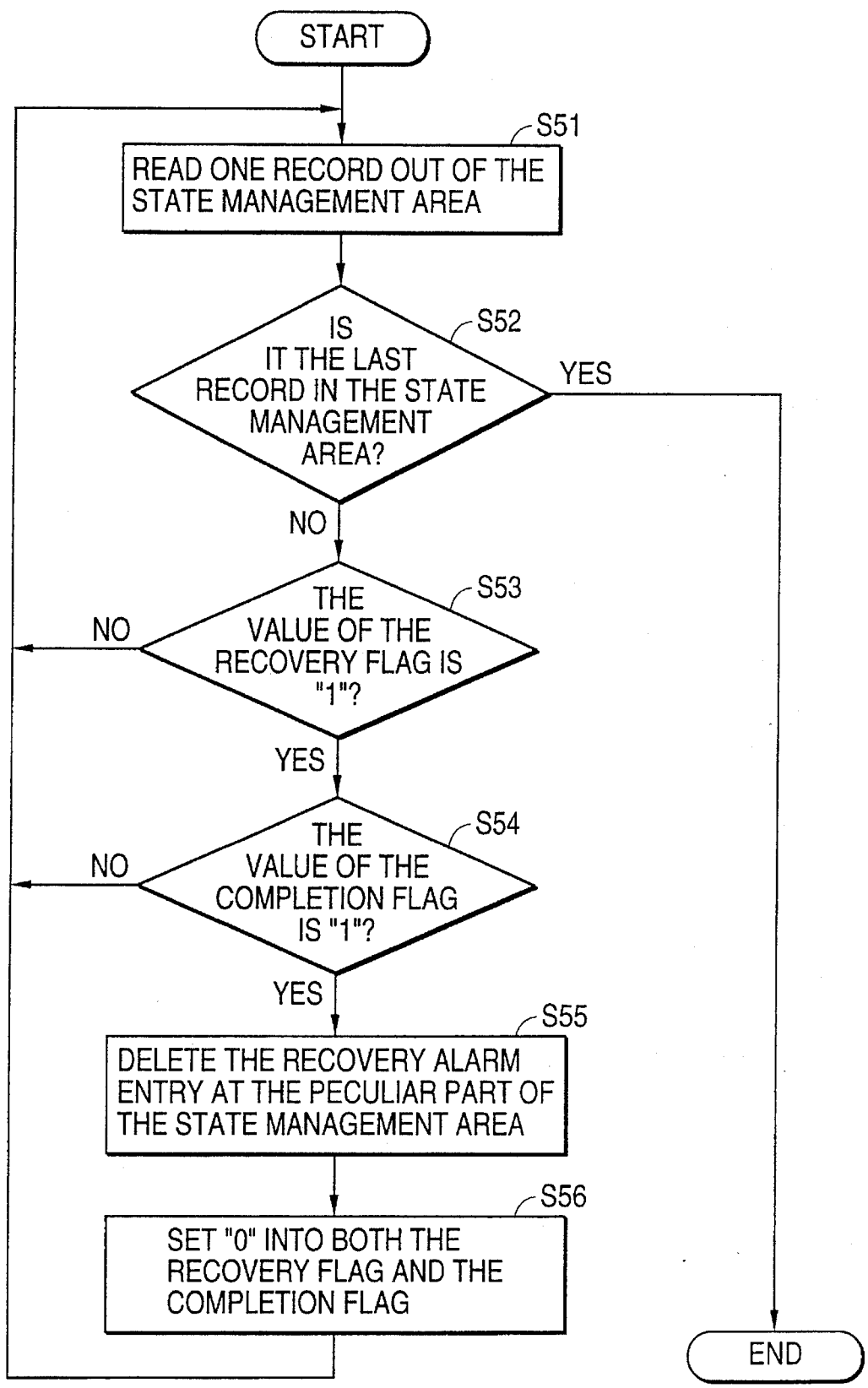
FIG. 9 is a flow chart showing the processing to delete a recovery alarm in the network management system according to the invention.
Figures 11A, 11B, 11C:
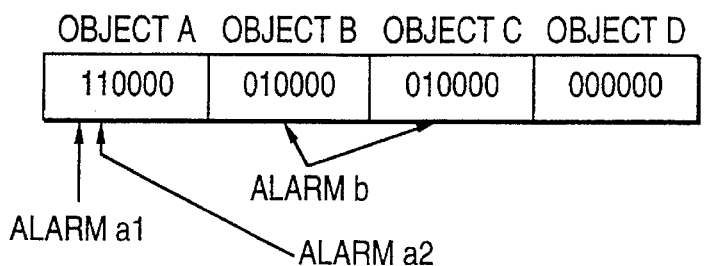

FIG. 9 shows that the progressing to delete a recovery alarm in the network management system 1 according to the invention comprises the state management area record reading step S51, last record decision step S52, a recovery flag "1" setting step S53, a completion flag "1" setting step S54, recovery alarm deletion step S55, and both recovery flag and completion flag "0" setting step S56.

Next, the operations of this network management system 1 configured as described above will be more specifically described with reference to the contents of the state management area 9 shown in FIGS. 10A–10G.

(1) When failure A arises in object 2A (see FIG. 10A):

The agent 5A receives alarm information of failure content code A from object 2A (step S1). The detailed information storage program 51 prepares a hash key consisting of the failure object code and the failure content code in the alarm information, adds to the prepared hash key the failure object code and detailed information in the alarm information, and saves them into the detailed information file 7 (step S2).

Then, the alarm information coding program 61 in the manager 6 transforms failure content code A in the alarm information into alarm code "0025" in accordance with a fixed rule (step S3). Also, the failure object code is transformed into a failure object ID.

Next the failure decision program 63 in the manager 6, as the highest figure of alarm code "0025" is "0", determines the alarm to be a failure alarm (step S4), and searches the failure pattern decision table 101 (see FIG. 4) of the knowledge base 10 by alarm code "0025" to acquire decision pattern "C1" (step S5).

Then, the failure decision program 63 in the manager 6 searches the cause decision table 102 (see FIG. 5) of the knowledge base 10 by decision pattern "C1" and judges that the failure has had no effect (step S6).

Next, the failure decision program 63 in the manager 6 searches the failure pattern decision table 101 (see FIG. 4) of the knowledge base 10 by alarm code "0025", determines the alarm to be a main cause alarm, and adds "1" after the lowest figure of alarm code "0025" to make it "00251" (step S7).

Then the state management program 62 in the manager 6, if it decides to enter alarm code "00251" into the state management area 9 (step S8), enters alarm code "00251" together with the file type and hash key of the detailed information file 7 into the peculiar part of the state management area 9 corresponding to the main unit failure of the MN alarm in object 2A with reference to the alarm code-perceived severity table 103 (see FIG. 6) of the knowledge base 10 (step S10). If the peculiar part has no sufficient capacity, the code is saved into an overflow file (not shown) indicated by the overflow pointer. Or if a decision is given at step S8 not to enter alarm code "00251" into the state management area 9, the inputted alarm information is cancelled (step S9).

Next, the state management program 62 in the manager 6 decides that no alarm code is entered in any other area of the peculiar part corresponding to the main unit failure of the MN alarm (step S11), and sets "1" into the corresponding detailed intensive flag of perceived severity (step S12).

Then, the state management program 62 in the manager 6 decides that no alarm code is entered in any other area of the peculiar part corresponding to the MN alarm (step S13), and sets "1" into the corresponding intensive flag of perceived severity (step S14).

(2) When failure B arises in object 2A (see FIG. 10B):

The agent 5A receives alarm information of failure content code B from object 2A (step S1). The detailed information storage program 51 prepares a hash key consisting of the failure object code and the failure content code in the alarm information, adds to the prepared hash key the failure object code and detailed information in the alarm information, and saves them into the detailed information file 7 (step S2).

Then, the alarm information coding program 61 in the manager 6 transforms failure content code B in the alarm information into alarm code "0026" in accordance with a fixed rule (step S3). Also, the failure object code is transformed into a failure object ID.

Next the failure decision program 63 in the manager 6, as the highest figure of alarm code "0026" is "0", determines the alarm to be a failure alarm (step S4), and searches the failure pattern decision table 101 (see FIG. 4) of the knowledge base 10 by alarm code "0026" to acquire decision pattern "B1" (step S5).

Then, its failure decision program 63 in the manager 6 searches the cause decision table 102 (see FIG. 5) of the knowledge base 10 by decision pattern "B1" and judges that the failure has had no effect (Step S6).

Next, its failure decision program 63 in the manager 6 searches the failure pattern decision table 101 (see FIG. 4) of the knowledge base 10 by alarm code "0026", determines the alarm to be a main cause alarm, and adds "1" after the lowest figure of alarm code "0026" to make it "00261" (step S7).

Then the state management program 62 in the manager 6, if it decides to enter alarm code "00261" into the state management area 9 (step S8), enters alarm code "00261" together with the file type and hash key of the detailed information file 7 into the peculiar part of the state management area 9 corresponding to the main unit failure of the MN alarm in object 2A with reference to the alarm code perceived severity table 103 (see FIG. 6) of the knowledge base 10 (step S10). If the peculiar part has no sufficient capacity, these pieces of information are saved into an overflow file (not shown) indicated by the overflow pointer. Or if a decision is given at step S8 not to enter alarm code "00261" into the state management area 9, the inputted alarm information is cancelled (step S9).

Next, the state management program 62 in the manager 6 decides that alarm code "00251" is entered in another area of the peculiar part corresponding to the main unit failure of the MN alarm (step S11), and does not set "1" into the corresponding detailed intensive flag of perceived severity.

Then, the state management program 62 in the manager 6 decides that an alarm code is entered in another area of the peculiar part corresponding to the MN alarm (step S13), and does not set "1" into the corresponding intensive flag of perceived severity.

(3) When failure C arises in object 2A (see FIG. 10C):

The agent 5B receives alarm information of failure content code C from object 2A (step S1). The detailed information storage program 51 prepares a hash key consisting of the failure object code and the failure content code in the alarm information, adds to the prepared hash key the failure object code and detailed information in the alarm information, and saves them into the detailed information file 7 (step S2).

Then, the alarm information coding program 61 in the manager 6 transforms failure content code C in the alarm information into alarm code "0013" in accordance with a fixed rule (step S3). Also, the failure object code is transformed into a failure object ID.

Next the failure decision program 63 in the manager 6, as the highest figure of alarm code "0013" is "0" determines the alarm to be a failure alarm (step S4), and searches the failure pattern decision table 101 (see FIG. 4) of the knowledge base 10 by alarm code "0013" to acquire decision pattern "A1" (step S5).

Then, its failure decision program 63 in the manager 6 searches the cause decision table 102 (see FIG. 5) of the knowledge base 10 by decision pattern "A1" and judges that the failure will have an effect in the next object (step S6). The "next object" in this context does not necessarily mean a physically adjoining object, but means an object adjoining on the same layer. As distinguished from it, a physically adjoining object is referred to as an adjoining object.

Next, its failure decision program 63 in the manager 6 searches the failure pattern decision table 101 (see FIG. 4) of the knowledge base 10 by alarm code "0013", determines the alarm to be a main cause alarm, and adds "1" after the lowest figure of alarm code "0013" to make it "00131" (step S7).

Then the state management program 62 in the manager 6, if it decides to enter alarm code "00131" into the state management area 9 (step S8), enters alarm code "00131" into the peculiar part of the state management area 9 corresponding to the main unit failure of the MJ alarm in object 2A with reference to the alarm code-perceived severity table 103 (see FIG. 6) of the knowledge base 10 (step S10). If the peculiar part has no sufficient capacity, the code is saved into an overflow file (not shown) indicated by the overflow pointer. Or if a decision is given at step S8 not to enter alarm code "00131" into the state management area 9, the inputted alarm information is cancelled (step S9).

Next, its state management program 62 in the manager 6 decides that no alarm code is entered in any other area of the peculiar part corresponding to the main unit failure of the MJ alarm (step S11), and sets "1" into the corresponding detailed intensive flat of perceived severity (step S12).

Then, its state management program 62 in the manager 6 decides that no alarm code is entered in any other area of the peculiar part corresponding to the MJ alarm (step S13), and sets "1" into the corresponding intensive flag of perceived severity (step S14).

(4) When failures D and E arise in object 2B (see FIG. 10D):

The agent 5A receives alarm information of failure content codes D and E from object 2A (step S1). The detailed information storage program 51 prepared hash keys each consisting of the failure object code and the failure content code in the alarm information, adds to each of the prepared hash keys the failure object code and detailed information in the alarm information, and saves them into the detailed information file 7 (step S2).

Then, the alarm information coding program 61 in the manager 6 transforms failure content codes D and E in the alarm information into alarm codes "0033" and "0034" in accordance with a fixed rule (step S3). Also, the failure object codes are transformed into failure object ID's.

Next the failure decision program 63 in the manager 6, as the highest figure of alarm codes "0033" and "0034" is "0", determines the alarms to be failure alarms (step S4), and searches the failure pattern decision table 101 (see FIG. 4) of the knowledge base 10 by alarm codes "0033" and "0034" to acquire decision pattern "A1" (step S5).

Then, its failure decision program 63 in the manager 6 searches the cause decision table 102 (see FIG. 5) of the knowledge base 10 by decision pattern "A1" and judges that the failures of both alarm codes "0033" and "0034" will have effects in the next object (step S6). Next, its failure decision program 63 in the manager 6 searches the failure pattern decision table 101 (see FIG. 4) of the knowledge base 10 by alarm codes "0033" and "0034", determines the alarms to be effect alarms, and adds "0" after the lowest figure of each of alarm codes "0033" and "0034" to make them "00330" and "00340", respectively (step S7).

Then the state management program 62 in the manager 6, if it decides to enter alarm codes "00330" and "00340" into the state management area 9 (step S8), enters alarm codes "00330" and "00340" into the peculiar part of the state management area 9 corresponding to the subordinate unit failure of the MN alarm in object 2B with reference to the alarm code-perceived severity table 103 (see FIG. 6) of the knowledge base 10 (step S10). If the peculiar part has no sufficient capacity, these codes are saved into an overflow file (not shown) indicated by the overflow pointer. Or if a decision is given at step S8 not to enter alarm codes "00330" and "00340" into the state management area 9, the inputted alarm information is cancelled (step S9).

Next, the state management program 62 in the manager 6 decides that no alarm code is entered in any other area of the peculiar part corresponding to the subordinate unit failure of the MN alarm (step S11), and sets "1" into the corresponding detailed intensive flag of perceived severity (step S12).

Then, the state management program 62 in the manager 6 decides with that no alarm code is entered in any other area of the peculiar part corresponding to the MN alarm (step S13), and sets "1" into the corresponding intensive flag of perceived severity (step S14).

(5) When notices of recovery from failures A and B arise in object 2A (see FIG. 10E):

The agent 5A receives alarm information of failure content codes D (recovery from failure A) and E (recovery from failure B) from object 2A (step S1). The detailed information storage program 51 prepared hash keys each consisting of the failure object code and the failure content code in the alarm information, adds to each of the prepared hash keys the failure object code and detailed information in the alarm information, and saves them into the detailed information file 7 (step S2).

Then, the alarm information coding program 61 in the manager 6 transforms failure content codes D and E in the alarm information into alarm cedes "1025" and "1026" in accordance with a fixed rule (step S3). Also, the failure object codes are transformed into failure object ID's.

Next the failure decision program 63 in the manager 6, as the highest figure of alarm codes "1025" and "1026" are "1", determines the alarms to be recovery alarms (step S4), and searches the failure pattern decision table 101 (see FIG. 4) of the knowledge base 10 by alarm codes "1025" and "1026" to acquire decision patterns "C1'" and "B1'" (neither is in FIG. 4) (step S15).

Then, the failure decision program 63 in the manager 6 searches the cause decision table 102 (see FIG. 5) of the knowledge base 10 by decision patterns "C1'" and "B1'", and judges that no failure will arise (step S16).

Next, the failure decision program 63 in the manager 6 searches the failure pattern decision table 101 (see FIG. 4) of the knowledge base 10 by alarm codes "1025" and "1026" determines the alarms to be main cause alarms (neither is in FIG. 4), and adds "1" after the lowest figure of each of alarm codes "1025" and "1026" to make them "10251" and "10261", respectively (step S17).

Next, the manager 6, as the lowest figure of alarm codes "10251" and "10261" is "1", determines the alarms to be main cause alarms with the failure decision program 63 (step S18) and, after searching an area of the peculiar part of the state management area 9 corresponding to the main unit failure of the MN alarm in object 2B for alarm codes "00251" and "00261" with reference to the alarm code-perceived severity table 103 (see FIG. 6) of the knowledge base 10 and deleting them, enters alarm codes "10251" and "10261" (step S19). If the peculiar part has no sufficient capacity, these codes are saved into an overflow file (not shown) indicated by the overflow pointer.

Next, the state management program 62 in the manager 6 decides that no alarm code is entered in any other area of the peculiar part corresponding to the main unit failure of the MN alarm (step S20), sets "0" into the corresponding detailed intensive flag of perceived severity (step S21), and sets "1" into the recovery flag (step S22).

Then, the state management program 62 in the manager 6 decides that no alarm code is entered in any other area of the peculiar part corresponding to the MN alarm (step S23), and sets "0" into the corresponding intensive flag of perceived severity (step S24).

Then, the failure decisions program 63 in the manager 6 searches the cause decision table 102 (see FIG. 5) of the knowledge base 10 by decision patterns "C1'" and "B1'", judges that no failure will arise (step S25), and thereby completes the processing.

(6) When a notice of recovery from failure C arises in object 2A (see FIGS. 10F–10G):

The agents 5A receives alarm information of failure content code F (recovery from failure C) from object 2A (step S1). The detailed information storage program 51 prepares a hash key consisting of the failure object code and the failure content code in the alarm information, adds to the prepared hash key the failure object code and detailed information in the alarm information, and saves them into the detailed information file 7 (step S2).

Then, the alarm information coding program 61 in the manager 6 transforms failure content code F in the alarm information into alarm code "1013" in accordance with a fixed rule (step S3).

Next the failure decision program 63 in the manager 6, as the highest figure of alarm code "1013" is "1", determines the alarm to be a recovery alarm (step S4), and searches the failure pattern decision table 101 (see FIG. 4) of the knowledge base 10 by alarm code "1013" to acquire decision pattern "A1'" (not in FIG. 4) (step S15).

Then, the failure decision program 63 in the manager 6 searches the cause decision table 102 (see FIG. 5) of the knowledge base 10 by decision pattern "A1'" and judges that effect alarms "0033" and "0034" have arisen in the next object (step S16).

Next, its failure decision program 63 in the manager 6 searches the failure pattern decision table 101 (see FIG. 4) of the knowledge base 10 by alarm code "1013", determines the alarm to be a main cause alarm (not in FIG. 4), and adds "1" after the lowest figure of alarm code "1013" to make it "10131" (step S17).

Next, the failure decision program 63 in the manager 6, as the lowest figure of alarm code "10131" is "1", determines the alarm to be a main cause alarm (step S18) and, after searching an area of the peculiar part of the state management area 9 corresponding to the main unit failure of the MJ alarm in object 2A for alarm code "00131" with reference to the alarm code-perceived severity table 103 (see FIG. 6) of the knowledge base 10 and deleting them, enters alarm code "10131" (step S19). If the peculiar part has no sufficient capacity, these codes are saved into an overflow file (not shown) indicated by the overflow pointer.

Next, the state management program 62 in the manager 6 decides that no alarm code is entered in any other area of the peculiar part corresponding to the main unit failure of the MJ alarm (step S20), sets "0" into the corresponding detailed intensive flag of perceived severity (step S21), and sets "1" into the recovery flag (step S22).

Then, the state management program 62 in the manager 6 decides that no alarm code is entered in any other area of the peculiar part corresponding to the MJ alarm (step S23), and sets "0" into the corresponding intensive flag of perceived severity (step S24).

Then, the failure decision program 63 in the manager 6 searches the cause decision table 102 (see FIG. 5) of the knowledge base 10 by decision pattern "A1'", judges that effect alarms due to alarm coders "0033" and "0034" may arise (step S25), finds that the next object is object 2B by referring to the system structure information of the structure information files 8, searches an area of the peculiar part of the state management area 9 corresponding to the subordinate unit failure of the MN alarm in object 2B for alarm codes "0033" and "0034" with reference to the alarm code-perceived severity table 103 (see FIG. 6) of the knowledge base 10, and deletes them (step S32).

Next, the state management program 62 in the manager 6 decides that no alarm code is entered in any other area of the peculiar part corresponding to the subordinate unit failure of the MN alarm (step S33), and sets "0" into the corresponding detailed intensive flag of perceived severity (step S34).

Then, the state management program 62 in the manager 6 decides that no alarm code is entered in any other area of the peculiar part corresponding to the MN alarm (step S35), and sets "0" into the corresponding intensive flag of perceived severity (step S36).

To add, the state management program 62 in the manager 6, if the alarm is found to be an effect alarm at step S18, judges whether or not the entered effect alarm is to be deleted from the state management area 9 (step S26); and, if it judges against deletion, Completes the processing immediately or, if it judges for deletion, decides whether or not the corresponding failure alarm is entered in the state management area 9 (step S27). If it is, the state management program 62 in the manager 6 deletes that failure alarm from the state management area 9 (step S31), and hands over the control to step S33. If it is not, the state management program 62 in the manager 6 judges whether or not the recovery alarm for the corresponding main cause is entered in the state management area (step S28). If it is, the state management program 62 in the manager 6 cancels the received effect alarm though it is normal (step S29) or, if it is not, hands over the control to step S33 after cancelling the received effect alarm as an error (step S30).

Incidentally, after an effect alarm is deleted from the state management area 9 by the recovery alarm for the corresponding main cause (steps S32 through S36), the recovery alarm for the effect whose reception was delayed by a lag in the network or any other cause, is to be deleted from the state management area 9, but the alarm code (for the alarm on the occurrence of the effect) is absent in the state management area 9. In order to accomplish processing with the recognition that this is no error, the recovery alarm for the main cause is kept entered in the state management area 9 for a certain period of time. Thus, if it is known that the recovery alarm for the main cause is entered at step S28, it can be recognized at steps S32 through S36 that the pertinent alarm has been already deleted, and the absence of error can be determined. Recovery alarms for main causes entered in the state management area 9 are searched for at regular intervals (for instance at three minutes' intervals), and deleted. In this procedure, only those recovery alarms whose pertinent recoveries have been confirmed by the operator on the terminal display (those for which "1" is set into the completion flags in the state management area 9) are deleted.

In further detail, its state management program 62 in the manager 6 reads in one record of the state management area 9 (step S51), and judges whether or not it is the last record of the state management area 9 (step S52). If it is not, the state management program 62 in the manager 6 judges whether or not "1" is set in the recovery flag (step S53); if "1" is not set, the control is returned to step S51 or, if "1" is set, its state management program 62 in the manager 6 judges whether or not "1" is set in the completion flag (step S54). If "1" is not set in the completion flag, the control is returned to step S51 or, if "1" is set, its state management program 62 in the manager 6 deletes the recovery alarm entered in the peculiar part of the state management area 9 (step S55), sets "0" into the recovery flag and the completion flag (step S56), and returns the control to step S51. If the record is found to be the last record of the state management area 9 at step S52, the manager 6 completes the processing.

Further the operator, upon confirmation of recovery from an issued alarm on the terminal display screen or the like (step S41), inputs a failure object code confirmed from the terminal or the like (step S42), and its state management program 62 in the manager 6 sets "1" into the completion flag for the pertinent object in the state management area 9 (step S43).

As hitherto described, the present invention, according to which alarm codes are stored on an object-by-object basis, has the advantage over the conventional state management system by the method of using only bit arrangements such that no entry of a new, or no alteration of the existing, bit pattern is necessitated by a change in its object structure resulting from the addition or withdrawal of any object, and such that the capacity of the state management area 9 does not have to be enlarged unnecessarily. There is the additional advantage of greater maintenance ease.

Unnecessary enlargement of the capacity of the state management area 9 is also prevented by the arrangement that alarm codes which have overflown the state management area 9 are saved into another file by an overflow pointer. Furthermore, the management of alarm codes provides the advantage that, even if the maim cause alarm is somehow prevented from reception, the main cause alarm can be presumed merely from an effect alarm that has arisen. Moreover, the storage of detailed information linked to alarm codes makes possible highly precise failure judgment using the alarm codes and the detailed information.

The use of aggregate values of states corresponding to stored alarm codes makes it possible to manage the states of objects in an aggregate form when a plurality of alarms per object have occurred, and linking with the program logic can be made easier than by the failure management system using the storage files of all alarm information, enabling failure judgment to be accomplished at higher speed.

What is claimed is:

1. A network management system for managing plural objects connected to a network, comprising:

detailed information storage means for storing into detailed information files detailed information contained in alarm information transmitted from the objects and hash keys prepared from said alarm information;

alarm information code means for converting said alarm information into alarm codes according to a fixed rule;

state management means for storing into a state management area said alarm codes together with file types indicating a main cause alarm or an effect alarm and said hash keys;

a knowledge base for entering therein combinations of alarm codes and effects of alarm information as decision patterns; and failure decision means for deriving a decision result, by matching, at the time of receiving alarm information, said knowledge base and said state management area with each other.

2. A network management system, as claimed in claim 1, wherein said state management area includes an object identifier (ID) and a common part having aggregate values of states, and a peculiar part having plural sets of alarm codes, types of detailed information files, and hash keys and an overflow pointer.

3. A network management system, as claimed in claim 2, wherein, when said state management area has insufficient capacity, additional alarm codes are saved into another file indicated by said overflow pointer.

4. A network management system, as claimed in claim 1, wherein said knowledge base includes a failure pattern decision table for saving alarm codes, main causes/effects, and decision patterns; a cause decision table for saving decision patterns, main cause alarm codes, effect alarm codes, and relevant objects; and an alarm code-perceived severity table for saving alarm codes, perceived severity, and failure types.

5. A network management system, as claimed in claim 4, wherein said file types are determined in accordance with said failure pattern decision table.

6. A network management system, as claimed in claim 1, wherein said state management area includes an object identifier (ID) and a common part having aggregate values of states, and a peculiar part having plural sets of alarm codes, types of detailed information files, and hash keys and an overflow pointer, and said knowledge base includes a failure pattern decision table for saving alarm codes, main causes/effects, and decision patterns; a cause decision table for saving decision patterns, main cause alarm codes, effect alarm codes, and relevant objects; and an alarm code-perceived severity table for saving alarm codes, perceived severity, and failure types.

7. A network management system, as claimed in claim 1, further comprising agents including said detailed information storage means, and a manager including said state management means and said failure decision means.

8. A network management system, as claimed in claim 1, wherein said hash keys are prepared from failure object codes and failure content codes contained in said alarm information.

* * * * *